United States Patent
Hassan et al.

[11] Patent Number: 5,946,625
[45] Date of Patent: *Aug. 31, 1999

[54] METHOD FOR IMPROVING CO-CHANNEL INTERFERENCE IN A CELLULAR SYSTEM

[75] Inventors: Amer Hassan; Stanley L. Reinhold; Rajaram Ramesh, all of Cary, N.C.

[73] Assignee: Ericsson, Inc., Research Triangle Park, N.C.

[*] Notice: This patent issued on a continued prosecution application filed under 37 CFR 1.53(d), and is subject to the twenty year patent term provisions of 35 U.S.C. 154(a)(2).

[21] Appl. No.: 08/728,564

[22] Filed: Oct. 10, 1996

[51] Int. Cl.⁶ .............................. H04Q 7/36; H04B 7/185
[52] U.S. Cl. ............................ 455/447; 455/452; 455/63; 455/427
[58] Field of Search ............................... 455/62, 63, 446, 455/447, 450, 451, 452, 509, 12.1, 427, 429, 453; 370/330, 337

[56] References Cited

U.S. PATENT DOCUMENTS

| | | | |
|---|---|---|---|
| 5,038,399 | 8/1991 | Bruckert | 455/62 |
| 5,475,868 | 12/1995 | Duque-Anton et al. | 455/63 |
| 5,497,504 | 3/1996 | Acampora et al. | 455/63 |
| 5,555,257 | 9/1996 | Dent | 455/63 |
| 5,669,062 | 9/1997 | Olds et al. | 455/62 |

FOREIGN PATENT DOCUMENTS

| | | |
|---|---|---|
| 0637895A2 | 7/1994 | European Pat. Off. . |
| 0637895A3 | 7/1994 | European Pat. Off. . |
| 0720405A2 | 12/1995 | European Pat. Off. . |
| WO93/17507 | 9/1993 | WIPO . |

OTHER PUBLICATIONS

"CIR Based Dynamic Channel Allocation Schemes and Handover Prioritisation for Mobile Satellite Systems," Branko Bjelajac, IEEE, May 1996, pp. 948–952.

"Usage of Adaptive Arrays to Solve Resource Planning Problems," M. Frullone et al., IEEE May 1996, pp. 527–530.

*Primary Examiner*—Reinhard J. Eisenzopf
*Assistant Examiner*—Lester G. Kincaid
*Attorney, Agent, or Firm*—Rhodes, Coats & Bennett, LLP

[57] ABSTRACT

A fractional loading scheme is used to improve the spectral efficiency of a cellular system, and therefore increase the number of users that the system can support. The fractional loading scheme allows only a fraction of the total number of available communication channels within each cell to be used simultaneously. Thus, each cell is deliberately underloaded to operate at less than its full capacity. The underloading of the individual cells reduces the spectral efficiency within each cell. However, the underloading of each cell means that there will be fewer interfering users at any given time so that the co-channel interference is reduced. This reduction in co-channel interference allows the reuse distance between co-channel cells to be reduced thereby increasing the reuse of frequencies throughout the system resulting in an increase in spectral efficiency in the system as a whole.

21 Claims, 8 Drawing Sheets

METHOD FOR IMPROVING CO-CHANNEL INTERFERENCE IN A CELLULAR SYSTEM

FIELD OF THE INVENTION

The present invention relates to cellular radio systems and more particularly to cellular arrangements and frequency plans for reducing co-channel interference in a cellular system.

BACKGROUND OF THE INVENTION

Traditionally, satellite systems use a single beam to cover a large geographic area. Within the coverage area, each carrier frequency is used only once. In 1995, the American Mobile Satellite Communications System became operational. This system uses a few spot beams to cover the continental United States, Alaska, and Hawaii. However, no two carrier frequencies are used simultaneously in the system. Since the available bandwidth limits the number of available channels, traditional satellite systems cannot support a large number of users.

In cellular communication systems, frequency reuse plans allow the same frequency to be used more than once within the system. Rather than use a single high power transmitter to cover a large geographic area, cellular systems employ a large number of low-power transmitters which broadcast a signal in relatively small geographic areas referred to as cells. Each cell may be only a few miles across, and theoretically could be as small as a few city blocks. By reducing the coverage area of the transmitter and creating a large number of cells, it is possible to reuse the same frequency in different cells. Thus, a single frequency may be used multiple times throughout the entire cellular system to increase caller capacity. For example, assume that a particular geographic region is served by a single high-powered transmitter having ten frequency channels. The system would be able to handle only ten simultaneous calls. The eleventh caller would be blocked because no other channels are available. If the same geographic region is divided into 100 cells and the same frequencies could be used in all cells, then 1,000 simultaneous calls could be supported. This cellular approach can be used in satellite systems to increase system capacity.

Unfortunately, immediate reuse of all available frequencies in adjacent cells is not practical because of co-channel interference. The actual boundaries of cells in the real world are ill-defined and subject to constant changes due to signal fluctuations. Thus, the coverage area in adjacent cells overlap and intermingle. A vehicle operating near the boundary of a cell would be in an ambiguous zone where the signal strength from two adjacent cells using the same frequency is roughly equal. This balanced zone or interference zone makes communications difficult. The mobile unit would lock first onto one transmission, then the other, as the signal strength from the transmitters in adjacent cells fluctuates. This constant hopping between transmissions would make communication impossible.

To avoid the problem of co-channel interference, cells operating on the same frequency are spatially separated so that the mobile unit operating within a cell receives the desired signal at a higher level than any potential interfering signal from co-channel cells. Cells operating at different frequencies are placed between any two co-channel cells. Thus, the mobile unit will change frequencies during hand-off as it approaches a cell boundary before entering the interference zone between any two co-channel cells.

In general, the power of any interfering signal diminishes with increasing distance between interfering users. A carrier frequency can be reused if the interference level is reduced sufficiently by separation between the co-channel calls. The interference level is measured by the carrier power to interference power ratio, C/l. The C/l ratio is the primary criteria used in designing frequency reuse plans.

From the foregoing, it should be apparent that the number of times a given frequency can be reused in a system is related to the separation distance or reuse distance between any two co-channel cells. Developing new frequency allocation plans which reduce the co-channel interference allowing greater reuse of frequencies without sacrificing signal quality would result in greater system capacity.

SUMMARY OF THE INVENTION

The present invention provides a frequency allocation plan for improving the spectral efficiency of a cellular system, and therefore increasing the number of users which the system can support. The method for allocating frequencies is based on the concept of fractional loading of cells within the system. The fractional loading technique is used to reduce co-channel interference thereby allowing reuse distances between co-channel cells to be reduced. By reducing the reuse distance, the same carrier frequency can be used more often to increase the spectral efficiency of the system as a whole.

According to the present invention, each cell within a cellular communication system is allocated a group of carrier frequencies. A multiple access scheme is used to divide the available carrier frequencies in each cell into a plurality of distinct communication channels. In the preferred embodiment of the invention, time division multiple access is used. Each carrier frequency is divided into a number of time slots with each slot representing a distinct communication channel within the cell. Within each cell, a fractional loading scheme is used to assign the available communication channels to individual users at call setup. The fractional loading scheme allows only a fraction of the total number of available communication channels within each cell to be used simultaneously. Thus, each cell is deliberately underloaded to operate at less than its full capacity. The underloading of the individual cells reduces the spectral efficiency within each cell. However, the underloading of each cell means that there will be fewer interfering users at any given time so that the co-channel interference is reduced. This reduction in co-channel interference allows the reuse distance between co-channel cells to be reduced thereby increasing the reuse of frequencies throughout the system resulting in an increase in spectral efficiency in the system as a whole.

A variety of fractional loading schemes can be used to assign frequencies to individual users within each cell. The simplest fractional loading scheme is to establish a maximum number of simultaneous users for each cell or carrier frequency. Once the threshold is reached, any additional users are blocked. Alternately, a signal quality test can be used to determine whether to allocate additional frequencies once the threshold is reached. A test signal is transmitted on an available channel before the channel is assigned. After transmitting the test signal, the quality of the test signal and/or its effect on the communication channels already in use in co-channel cells can be measured. If the test signal does not degrade signal quality, then the channel can be assigned.

In another aspect of the present invention, the available communication channel within each cell may be randomly assigned. Alternately, communication channels can be assigned to minimize, as much as possible, the use of each communication channel at any given time among all co-channel cells. For each available communication channel, the total number of users in all co-channel cells for that particular channel is determined. The channel with the least number of users considering co-channel cells is assigned.

Other objects and advantages of the present invention will become apparent and obvious from a study of the following description and the accompanying drawings which are merely illustrative of such invention.

DETAILED DESCRIPTION OF THE INVENTION

Figure 1:
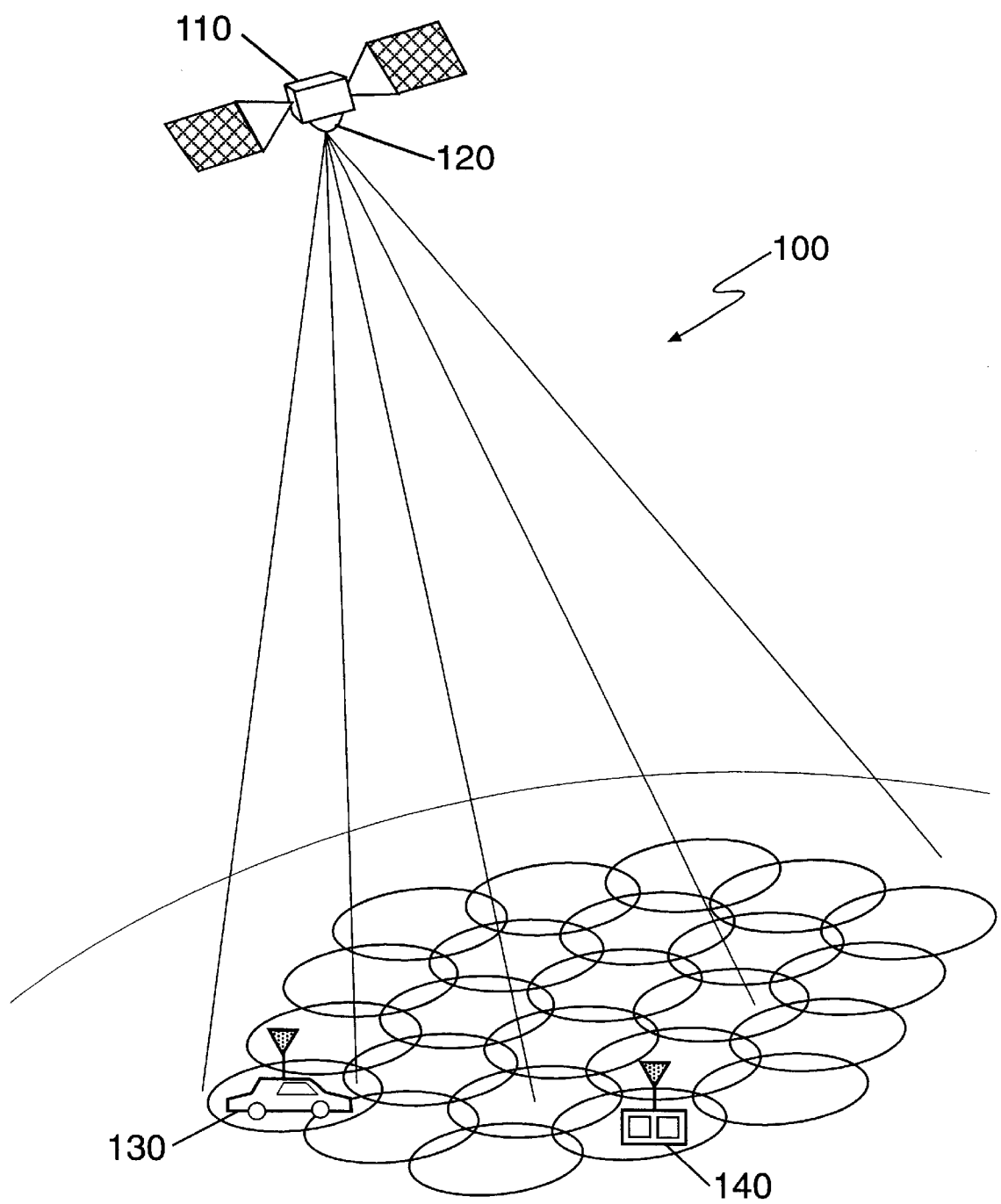
FIG. 1 is an illustration of a multiple-beam satellite communication system.

Referring now to the drawings, and particularly to FIG. 1, a satellite communication system is shown therein and indicated generally by the numeral 100. The satellite communication system 100 includes one or more satellites 110 having multiple beam antennas 120 which project a plurality of spot beams onto the surface of the earth which cover a designated geographic area. Preferably, the system includes 100 or more spot beams which provide a communication medium for communications between earth stations. The earth station may be a fixed station 140 or a mobile station 130. The fixed station 140 may, for example, be a mobile services switching center (MSC) which provides an interface between the satellite communication system 100 and the Public Switched Telephone Network (PSTN). Calls between two earth stations, either fixed or mobile, are transmitted via the satellite 110. Switching circuits aboard the satellite 110 allow calls originating in one spot beam to be transmitted to an earth station in another spot beam. In systems that use more than one satellite, the connection may be made via cross link between two or more satellites 110.

The satellite communication system 100 resembles a land-based mobile cellular communication system. The spot beams projected onto the earth's surface are analogous to the cells of a land-based cellular system . The satellite 110 is analogous to a base station which serves as the mobile units interface to the communication network. However, unlike land-based cellular systems, a single satellite can serve as a base station for multiple spot beams or cells.

Similar to land-based cellular systems, the satellite communication system 100 employs the concept of frequency reuse to increase the spectral efficiency of the system. Frequency reuse means that the same frequency may be used simultaneously in different cells or spot beams within the communication network. Quite obviously, the ability to reuse the same frequencies many times within a communication system has great potential for increasing the spectral efficiency of the system. An increase in spectral efficiency means that a greater number of simultaneous users can be supported. Spectral efficiency is measured in terms of user's per Mhz per $km^2$ or users per Mhz per cell.

Figure 2:
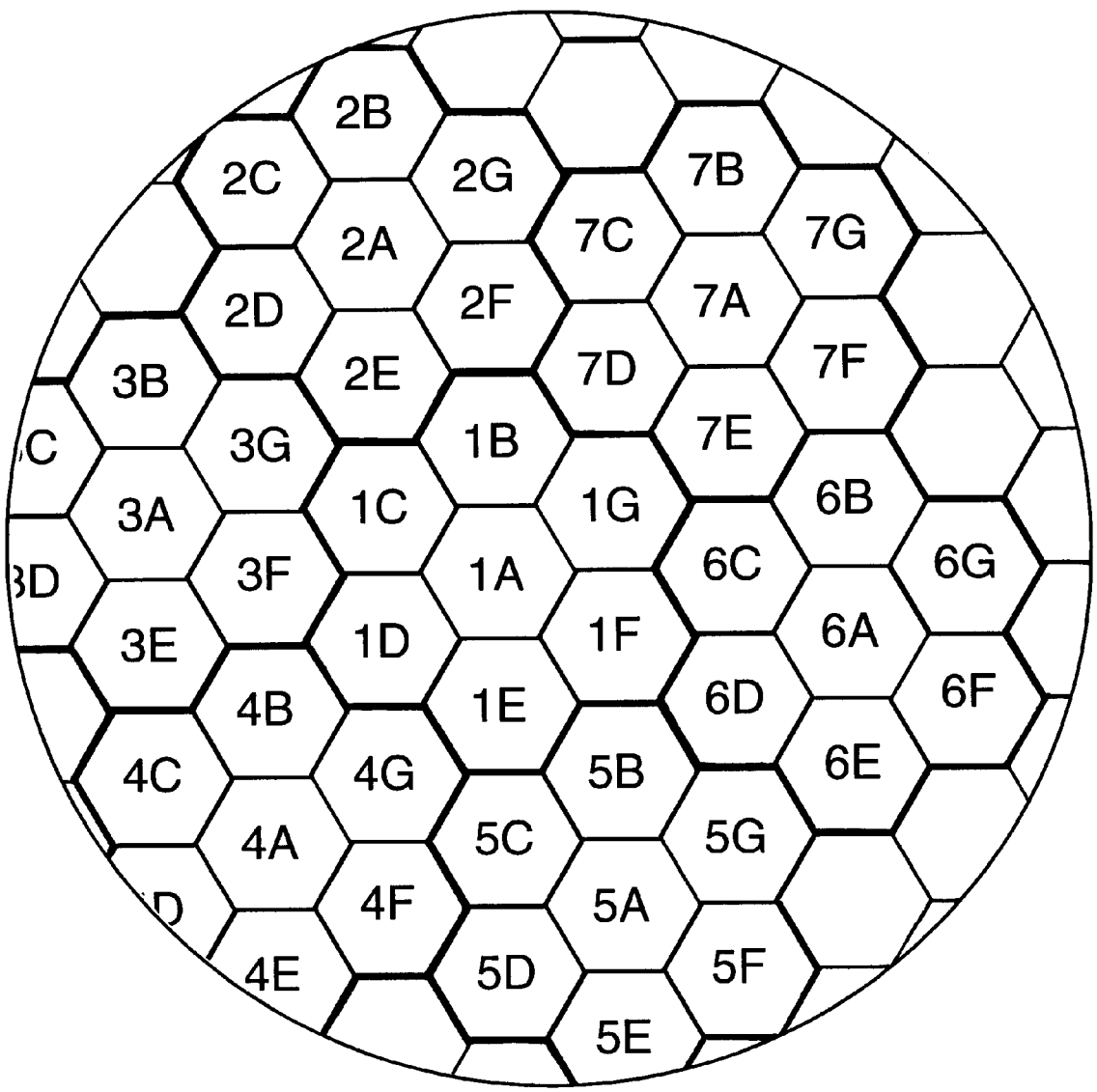
FIG. 2 is a diagram of the cell layout for a cellular communication system having a plurality of hexagonally packed cells.

Referring now to FIG. 2, a 7-cell reuse plan is shown. As in a conventional cellular system, the available frequencies used for communication are sub-divided into frequency groups which are then allocated in a way to reduce co-channel interference. The frequency groups are assigned to cells so that adjacent cells do not use the same frequency group. The frequency allocation scheme is called a reuse pattern. Cells to which the same frequency has been assigned are called co-channel cells. Co-channel cells are spatially separated from one another to reduce co-channel interference. The cells are grouped into clusters which includes one cell from each frequency group.

Within each cell or spot beam, a multiple access scheme is used to allocate communication channels to, individual user stations. For example, frequency-division multiple access (FDMA), time-division multiple access (TDMA), or code-division multiple access (CDMA) can be used. In the present invention, TDMA is used. The TDMA scheme has been standardized by the electronics industry association (IEA) and the telecommunication industry association (TIA) as IS-54, which is incorporated herein by reference.

Figure 3:
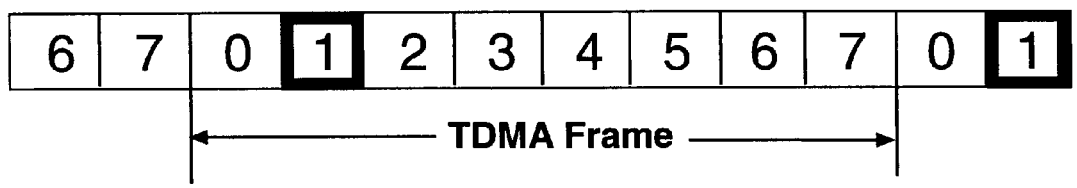
FIG. 3 is a diagram representing a single carrier frequency in a TDMA system.

FIG. 3 is an illustration of a TDMA carrier. In TDMA, each carrier frequency is divided into a series of frames which are further subdivided into time slots. The frames repeat at a fixed interval of time. In the preferred embodiment of the invention, each frame is divided into 8 time slots. Each time slot represents a distinct communication channel which can support a single user station. When a call is established, each user station is assigned a distinct time slot during which the user station transmits and receives voice or data in short bursts. The burst transmissions must take place in the assigned time slot so as not to interfere with the transmission from other user stations using a different time slot in the same carrier frequency. Thus, there may be 16 users assigned to each carrier frequency.

The reuse pattern chosen for a cellular system (either land based or satellite based) effects both the amount of co-channel interference experienced and the system capacity. For example, a four-cell reuse pattern will improve spectral efficiency as compared to a seven-cell reuse pattern. In a four-cell reuse pattern, the same frequency can be used in one of every four cells. In a seven-cell reuse pattern, the same frequency is used in one of every seven cells. Assuming that the number and size of cells is fixed, a four-cell reuse pattern will increase spectral efficiency by approximately seventy-five percent. However, the co-channel cells in a four-cell pattern will be closer to one another than the co-channel cells in a seven-cell reuse pattern. Thus, a four-cell reuse pattern increases the amount of co-channel interference that will be experienced.

The carrier to interference ratio C/I is the fundamental parameter in calculations of reuse factors. In system design, co-channel interference must be addressed from two perspectives. First, the required C/I needed so that the degradation in $E_B/N_O$ is less than a specified value must be determined. The ratio $E_B/N_O$ represents the energy per information bit over the noise spectral density. Second, the system must be designed so that the actual C/l experienced due to co-channel interference is above the minimum required C/l a predetermined percentage of the time.

The C/l that is required such that the ratio $E_B/N_O$ does not degrade substantially can be derived as follows. The composite $E_B/(N_O+I_O)$ can be written as:

$$\frac{E_b}{N_B + Io} = \left[\left(\frac{E_b}{No}\right)^{-1} + \left(\frac{E_b}{Io}\right)^{-1}\right]^{-1} \quad (1)$$

Since $E_B=C/R_B$, $I_O=I/BW$, and $BW=R_b/(mR)$, equation 1 can be rewritten as:

$$\frac{E_b}{N_O + Io} = \left[\left(\frac{E_b}{No}\right)^{-1} + \left(\frac{C}{ImR}\right)^{-1}\right]^{-1} \quad (2)$$

where m is the modulation order and R is the effective code rate. For QPSK, the modulation order m=2. Solving equation 2 for C/l produces the following expression:

$$\left(\frac{C}{I}\right)_{REQ} = 2*R*\left[\left(\frac{E_b}{No+Io}\right)^{-1} - \left(\frac{E_b}{No}\right)^{-1}\right]^{-1} \quad (3)$$

The minimum required C/l which results in maximum degradation in $E_B/N_O$ is given by the following expression (in dB):

$$\left(\frac{C}{I}\right)_{REQ} = 10\log\left[\left(10^{\frac{E_b}{N_O}}\right)^{-1} - \left(10^{\frac{E_b}{N_O}+\Delta}\right)^{-1}\right] + 10\log R + 3 \quad (4)$$

Figure 4:
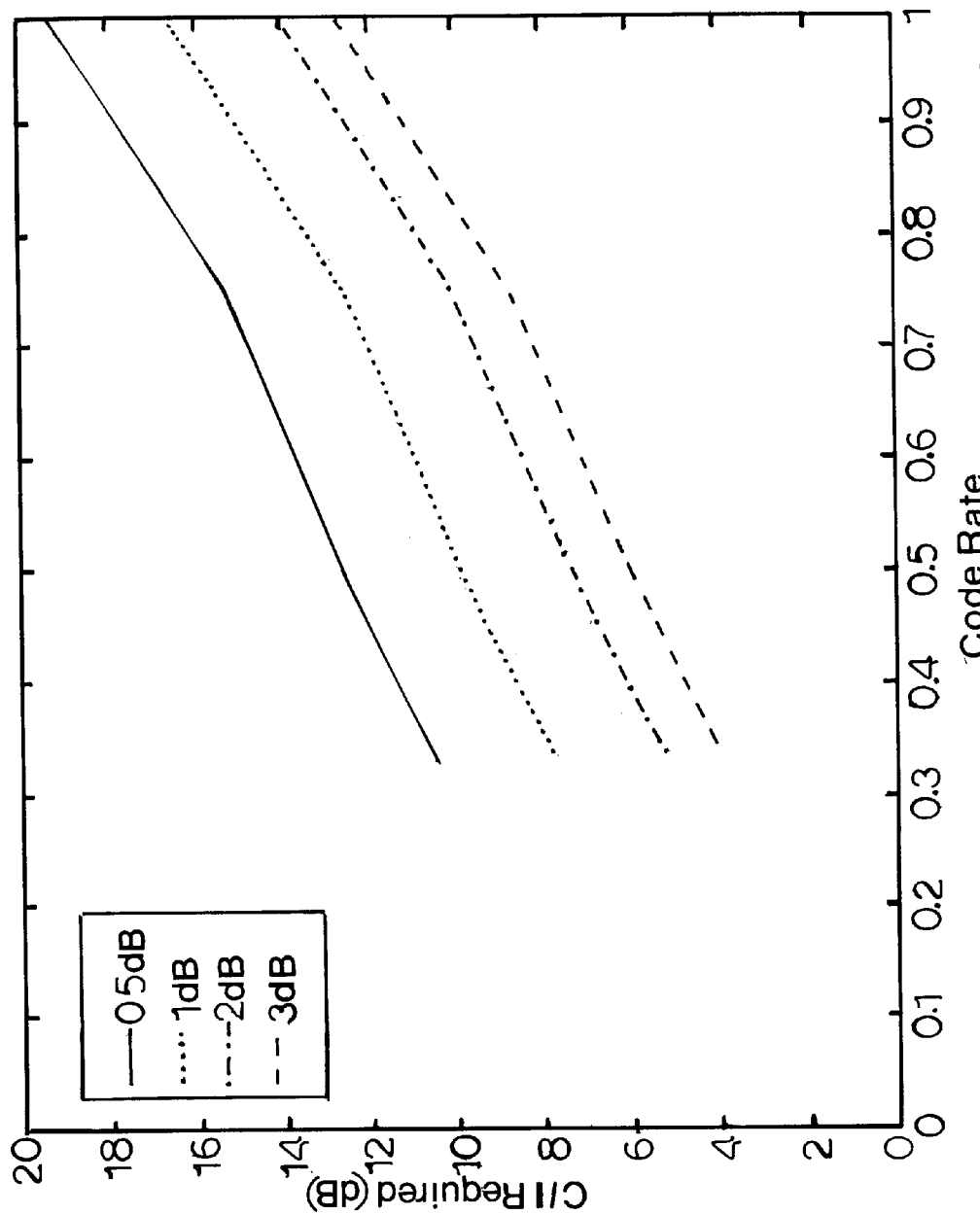
FIG. 4 is a graph of the carrier to interference ratio as a function of code rate.

In FIG. 4, Equation 4 is plotted for probable losses of 0.5, 1, 2, and 3 decibels as a function of channel code rate. The required $E_B/N_O$ for BER=$10^{-3}$ for different code rates was obtained from Clark and Cain for a Rice factor K=6. The values for $E_B/N_O$ are 6.7 dB for a code rate of 1, 3.9 dB for a code rate of ¾, 3.5 dB for a code rate of ⅔, 3.0 dB for a code rate of ½, 2.6 dB for a code rate of ⅓, and 2.3 dB for a code rate of ¼. A reasonable operating point is therefore a C/l of 10.5 to 12.5 dB which allows the use of either a ½rate or ⅓rate code with a loss due to co-channel interference no greater than 0.5 dB.

Once the minimum required C/l is determined, the cell layout and reuse pattern is designed so that the actual C/l experienced will exceed the minimum required C/l. In conventional mobile cellular systems (both land-based and satellite-based), the cell layout and frequency allocation is designed to obtain the minimum required C/l under fully loaded conditions. That is the calculation of re-use distances assumes that all available channels will be in use simultaneously. The present invention departs from this prior art practice. A fractional loading technique is used to reduce co-channel interference thereby allowing reuse distances between co-channel cells to be reduced. By reducing the reuse distance, the same carrier frequency can be used more often to increase the spectral efficiency of the system as a whole.

Figure 5:
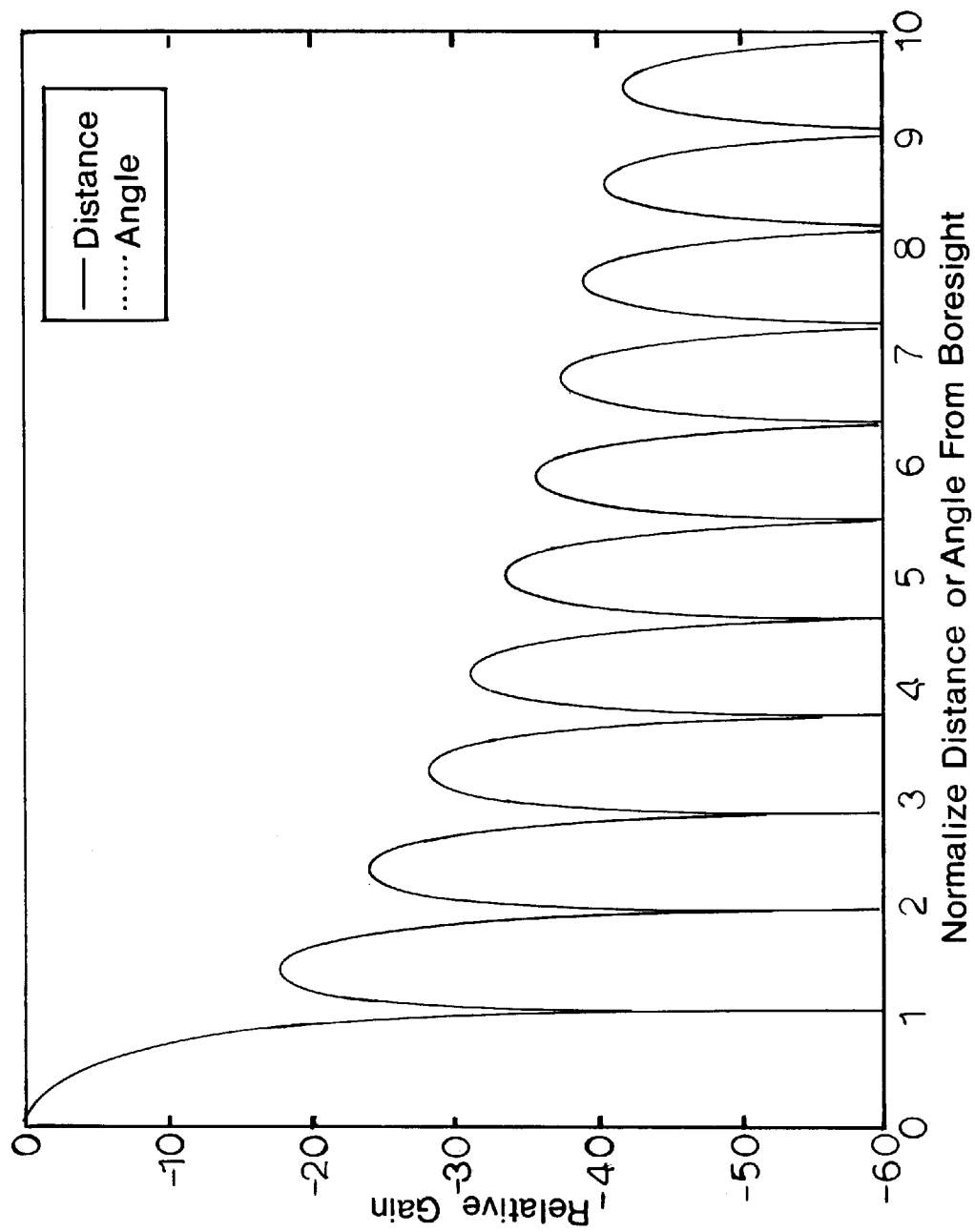
FIG. 5 is a graph of a typical antenna discrimination pattern for a satellite antenna.

A computer simulation of a satellite communication system has been used to demonstrate the fractional loading technique. The actual C/l for a satellite communication system can be mathematically described by the following equation:

$$\left(\frac{C}{I}\right) \text{Actual} = 10\log\left\{\sum_{i=1}^{N}[10^{Ant_{dis}+\delta Pi]/10}]^{-1}\right\}^{-1} \quad (5)$$

where N is the total number of co-channel interferers, $Ant_{dis}$ is the antenna discrimination between the user and the i-th interferer, and $\delta P_i$ is the difference in $E_b/N_O$ between the user and the i-th interferer. The antenna discrimination is a measure of the ability of the antenna to reject signals that are received off-axis to the antenna boresight. A typical antenna discrimination pattern is shown in FIG. 5. As seen in FIG. 5, the relative gain as the distance or angle from the antenna boresight increase, declines non-monotonically and includes a number of side lobes. The side lobes can result in the reception of interfering signals in an unwanted direction.

The expression in equation 5 was used to model a satellite communication system having 61 cells in a hexagonally packed beam pattern. Each beam is assumed to result from a uniformly illuminated circular aperture. All beams were uniformly loaded. Depending on the location of the user within a beam, the power for that user was modulated so that all users within a beam have equal power at the ground for the forward-link, and conversely, equal received signal strengths at the satellite for the return link. Users were randomly placed within 25% of the crossover distance from the center of a beam.

Table 1 below is a summary of the simulation showing the relationship between C/l and the crossover distance. For this simulation, the co-channel interference from 60 interfering users was assumed. The cross-over distances between adjacent beams was varied between 2 dB and 10 dB. The results indicate that a cross-over distance of about 4.5 dB yields the highest C/l for the 98th percentile case, and is nearly optimum for the mean, 90th, and 95th percentile cases. It also indicates that without DTX, rate ⅓channel coding or more is required to meet a requirement of 0.5 dB loss due to co-channel interference.

TABLE 1

| C/l mean | 90% | 95% | 98% | DTX | Slow PC | PC Err. | Cross Dist. |
|---|---|---|---|---|---|---|---|
| 0.1 | −0.5 | −0.7 | −1.0 | NO | YES | NO | 2.0dB |
| 2.4 | 1.7 | 1.4 | 1.2 | NO | YES | NO | 2.5dB |
| 6.9 | 5.6 | 5.2 | 5.0 | NO | YES | NO | 3.0dB |
| 11.2 | 9.2 | 8.8 | 8.4 | NO | YES | NO | 3.5dB |
| 10.7 | 10.3 | 10.1 | 10.0 | NO | YES | NO | 4.0dB |
| 10.5 | 10.0 | 9.8 | 9.5 | NO | YES | NO | 4.5dB |
| 10.1 | 9.4 | 9.3 | 9.0 | NO | YES | NO | 5.0dB |
| 9.7 | 9.0 | 8.9 | 8.6 | NO | YES | NO | 6.0dB |
| 9.5 | 8.8 | 8.7 | 8.5 | NO | YES | NO | 6.5dB |
| 9.4 | 9.9 | 8.9 | 8.7 | NO | YES | NO | 7.5dB |
| 9.7 | 9.3 | 9.2 | 9.0 | NO | YES | NO | 10.0dB |

Figure 6:
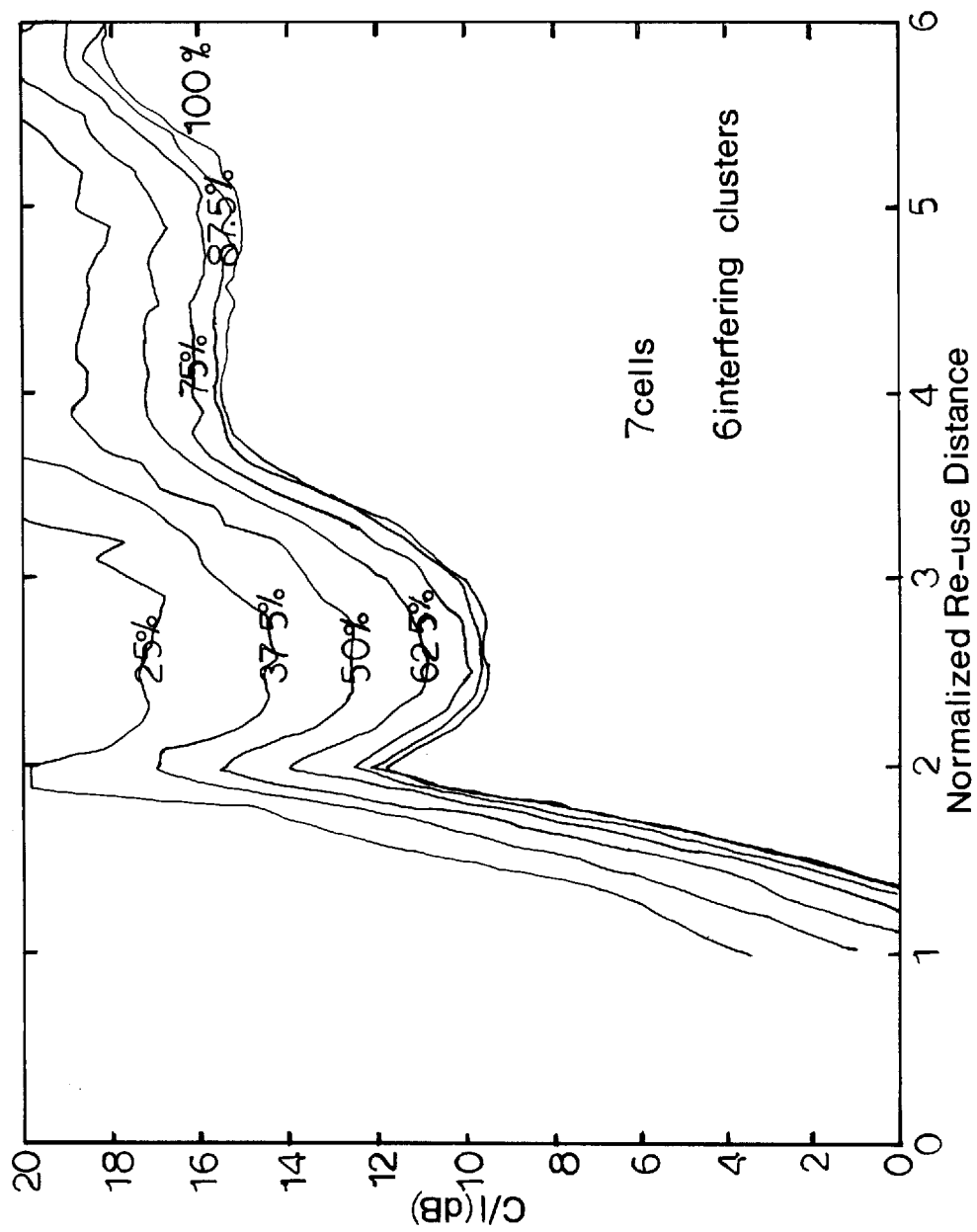
FIG. 6 is a graph of the relationship between the carrier-to-interference ratio and the effect of fractional loading in a 7-cell cellular system with 6 interferers.
Figure 7:
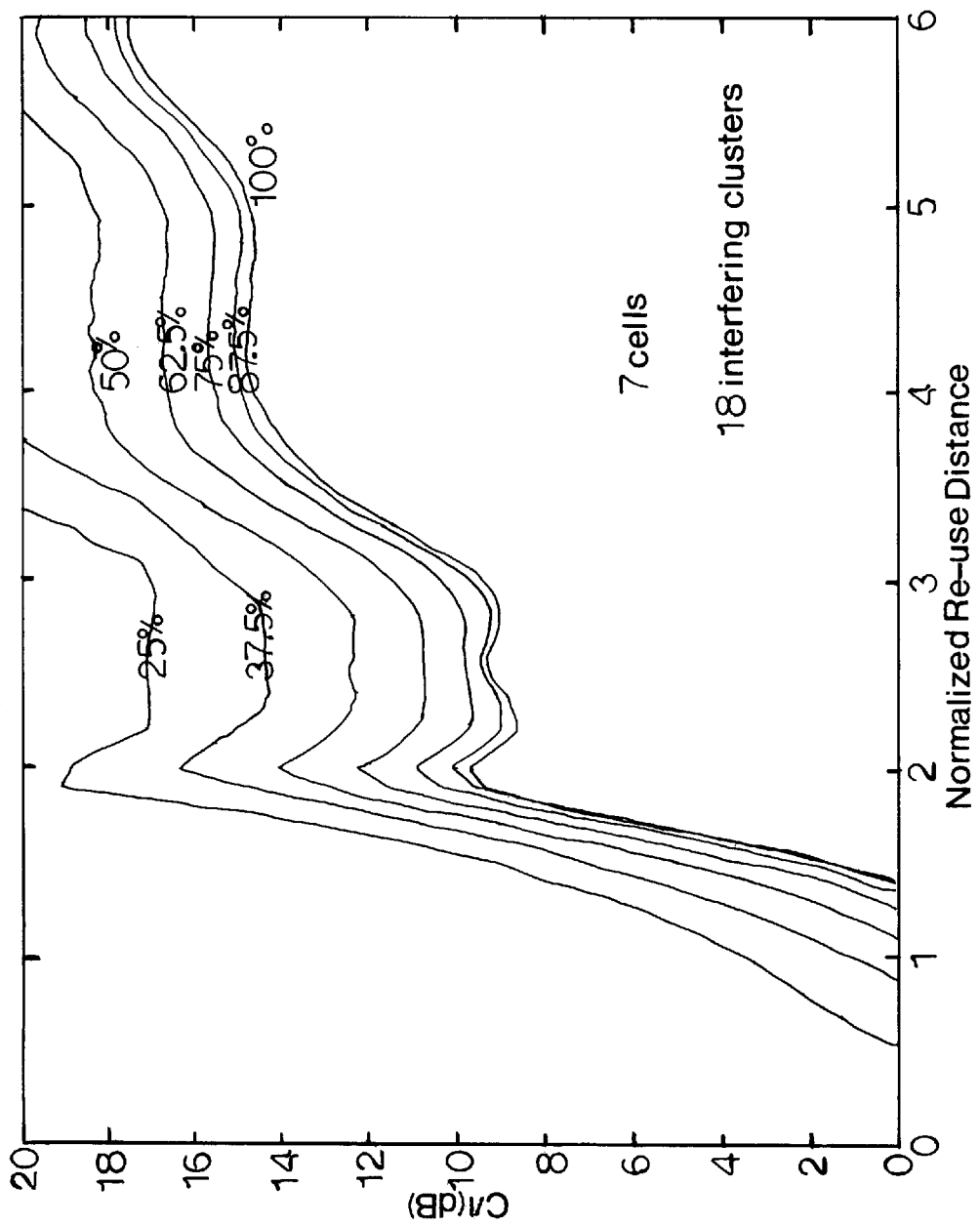
FIG. 7 is a graph of the relationship between the carrier-to-interference ratio and the effect of fractional loading in a 7-cell cellular system with 18 interferers.

FIG. 6 is a graph showing the effect of fractional loading on C/l for a 7-cell pattern with 6 interfering clusters based upon a computer simulation. FIG. 7 is a graph showing the effect of fractional loading on C/l for a 7-cell pattern with 18 interfering clusters based on a computer simulation. These graphs show a peak in the C/l at a normalized reuse distance of approximately 2. There are circumstances where this peak in the C/l can be used advantageously to increase the spectral efficiency of the system by fractional loading the cells. For example, referring to FIG. 6, assume that a C/l of at least 12 is required to maintain acceptable signal quality. If the system is fully loaded at 100% of capacity, then a normalized reuse distance of approximately 3.3 is required. However, a minimum C/l of 12 can also be obtained at a normalized reuse distance of 2.0 by loading the cell at 62.5% of its full capacity. That is, if it is assumed that no more than 62.5% of the available channels in any given cell will be used simultaneously then the reuse distance can be reduced from 3.3 to 2.0. The fractional loading in a cell results in a loss of spectral efficiency in that cell. However, that loss is offset by a gain in the spectral efficiency of the system as a whole resulting from a reduction in the reuse distance between co-channel cells. In many cases, the gain attributable to a reduction of the reuse distance will exceed the loss attributable to the fractional loading of the cells. In such cases, the fractional loading of the cells can result in greater spectral efficiency overall.

As an example, assume that a 7-cell reuse pattern is required in a fully loaded system because of co-channel interference. The underloading of carrier frequencies would reduce the spectral efficiency within a carrier but would result in fewer interferers and consequently a higher total C/l when all interferers are considered. Assume that the reduction in C/l resulting from a 75% load would allow a 4-cell reuse pattern. The net result would be a 31% increase in spectral efficiency throughout the system.

There are a number of different ways to implement the fractional loading technique in the satellite communication system of the present invention. The simplest technique is to randomly assign the available time slots in a TDMA carrier frequency until a predetermined maximum loading level is reached. For example, if a maximum loading level of 75% is established and there are 16 available time slots in each carrier frequency, then only 12 of the available time slots will be assigned at any given time. Thus, at any given moment in time, there will be at least four unused time slots.

A slightly more complex technique involves the use of a signal quality test to determine whether additional frequencies can be assigned after the predetermined threshold has been reached. The satellite can determine whether to assign additional channels by transmitting a test signal on one of the available channels and measuring the quality of the test signal. If the quality of the test signal is at an acceptable level, then the channel can be allocated. Instead of measuring the quality of the test signal, the effect of the test signal on the channels already in use could also be measured. If the signal quality in the channels already in use in co-channel cells remains at an acceptable level during transmission of the test signal, then the channel may be assigned. This process allows some flexibility in the allocation of communication channels above the predetermined threshold and can increase spectral efficiency.

Figure 8:
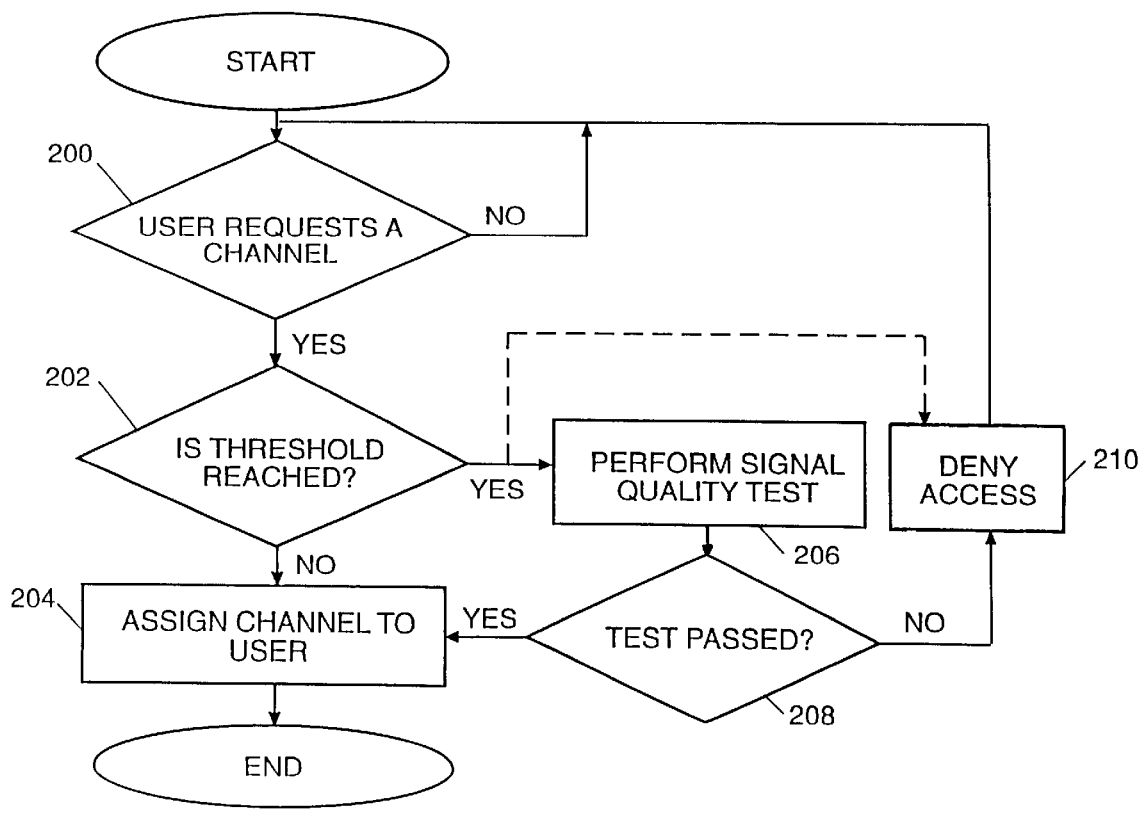
FIG. 8 is a flow diagram illustrating how the available communication channels are assigned in a fractional loading scheme.

FIG. 8 is a flow diagram of the decision process for determining whether to allocate a new channel. After a request is received for a communication channel (block 200), it is determined whether the number of channels already in use meet a predetermined threshold (block 202). If the number of users is less than the threshold, then a new channel is allocated (block 204). If not, a signal quality test is conducted (block 206). If the outcome of the signal quality meets certain predetermined criteria ,i.e. the test is passed (block 208), then a new channel is allocated to the user (block 204). If the signal quality test is failed (block 208) then access is denied (block 210).

Rather than randomly assign the communication channels within a cell, an adaptive allocation can be made to minimize, as much as possible, the disproportionate use of one particular channel in a group of two channel cells to minimize co-channel interference. One example of adaptive allocation would be to assign channels in a cell based on the usage rate of that channel in all co-channel cells. For example, when a communication channel is requested by a user, the available channels in that cell are determined. The next step is to determine which of the available channels is being least used considering all co-channel cells. The channel which is being least used when all co-channel cells are considered is assigned. Other adaptive allocation schemes where channel allocation is made according to pre-determined criteria will occur to those skilled in the art.

The present invention may, of course, be carried out in other specific ways than those herein set forth without departing from the spirit and essential characteristics of the invention. For example, the particular dimensions used in describing the prototype of the convection oven built according to the present invention are not intended to limit the scope of the claims, but are provided only as examples. The present embodiments are, therefore, to be considered in all respects as illustrative and not restrictive, and all changes coming within the meaning and equivalency range of the appended claims are intended to be embraced therein.

What is claimed is:

1. A method for improving spectral efficiency in a cellular radio communication system having a fixed frequency allocation plan and a plurality of cells, comprising:
   (a) allocating the available carrier frequencies within the system to said cells with each carrier frequency providing one or more distinct communication channels so that a plurality of communication channels are available in each cell;
   (b) establishing a pre-determined fractional load for selected cells, said pre-determined fractional load being less than the maximum number of available communication channels allocated to said cell; and
   (c) spacing co-channel cells in said cellular communication system in a predetermined manner to meet a pre-determined signal quality standard based on said pre-determined fractional load for said selected cells.

2. The method according to claim 1 wherein the available communication channels in the fractionally loaded cells are assigned at random.

3. The method according to claim 1 wherein the assignment of communication channels in the fractionally loaded cells is made to minimize the simultaneous use of the communication channel in all co-channel cells.

4. The method according to claim 1 further including the step of denying access when the predetermined fractional load is reached in the selected cells.

5. The method according to claim 1 further including the step of transmitting a test signal on an unused channel when the predetermined fractional load is reached in the selected cells and performing a signal quality test to determine whether additional channels should be assigned.

6. The method according to claim 5 wherein said signal quality test comprises testing the signal quality on the test channel.

7. The method according to claim 5 wherein said signal quality test comprises testing the effect of the test signal on a channel already in use.

8. A cellular radio communication system having a fixed frequency allocation scheme, comprising:
   (a) a plurality of cells, each cell being assigned one or more carrier frequencies which provide a plurality of distinct communication channels in each cell;
   (b) wherein selected cells are assigned a predetermined fractional load which is less than all of the available channels in said selected cells; and
   (c) wherein co-channel cells in said radio communication system are spaced in a predetermined manner to meet a pre-determined signal quality standard based on said predetermined fractional load in said selected cells.

9. The cellular radio communication system according to claim 8 wherein the assignment of communication channels in the fractionally-loaded cells is made at random.

10. The cellular communication system according to claim 8 wherein the assignment of communication channels in the fractionally-loaded cells is made to minimize the simultaneous use of the communication channels in all co-channel cells.

11. The cellular radio communication system according to claim 8 wherein the assignment of communication channels to users is blocked when the predetermined fractional load is reached in the selected cells.

12. The cellular radio communication system according to claim 8 wherein the assignment of communication channels to users once said predetermined fractional load is reached in said selected cells is based on a signal quality test.

13. The cellular radio communication system according to claim 12 wherein the signal quality test comprises transmitting a test signal on an available channel and measuring the signal quality of the test signal.

14. The cellular radio communication system according to claim 12 wherein the signal quality test comprises transmitting a test signal on an available channel and measuring the effect of the test signal on other user's assigned the same channel in other co-channel cells.

15. A method for increasing the number of users in a multiple beam satellite communication system having a plurality of spot beams and a fixed frequency allocation scheme, comprising the steps of:

(a) assigning the available carrier frequencies within the system to said spot beams with each carrier frequency providing one or more distinct communication channels so that a plurality of communication channels are available in each cell;

(b) setting a pre-determined fractional load for selected spot beams, said predetermined fractional load being less than the maximum number of said communication channels allocated to said spot beam; and (c) spacing the co-channel spot beams in a predetermined manner to obtain a pre-determined minimum signal quality standard based on the assumption that the maximum number of communication channels operating within said selected spot beams does not exceed said pre-determined fractional load.

16. The method according to claim 15 wherein the available communication channels in the fractionally loaded spot beams are assigned at random.

17. The method according to claim 15 wherein the assignment of communication channels in the fractionally loaded spot beams is made to minimize the simultaneous use of the communication channel in all co-channel spot beams.

18. The method according to claim 15 further including the step of denying access when the predetermined fractional load is reached in the selected cells.

19. The method according to claim 15 further including the step of transmitting a test signal on an unused channel when the predetermined fractional load is reached in the selected cells and performing a signal quality test to determine whether additional channels should be assigned.

20. The method according to claim 19 wherein said signal quality test comprises testing the signal quality on the test channel.

21. The method according to claim 19 wherein said signal quality test comprise testing the effect of the test signal on a channel already in use.

* * * * *